(12) United States Patent
Deisinger et al.

(10) Patent No.: US 8,172,691 B2
(45) Date of Patent: May 8, 2012

(54) BOOT

(75) Inventors: Markus Deisinger, Siegburg (DE); Thomas Schmidt, Siegburg (DE); Ralf Schumacher, Cologne (DE)

(73) Assignee: GKN Driveline International GmbH, Lohmar (DE)

( * ) Notice: Subject to any disclaimer, the term of this patent is extended or adjusted under 35 U.S.C. 154(b) by 68 days.

(21) Appl. No.: 12/813,631

(22) Filed: Jun. 11, 2010

(65) Prior Publication Data

US 2010/0248849 A1 Sep. 30, 2010

Related U.S. Application Data

(63) Continuation of application No. PCT/EP2007/010858, filed on Dec. 12, 2007.

(51) Int. Cl.
*F16D 3/84* (2006.01)
(52) U.S. Cl. .................................. 464/175; 464/173
(58) Field of Classification Search .................. 464/173, 464/175; 277/634–636; 74/18–18.2; 403/50, 403/51
See application file for complete search history.

(56) References Cited

U.S. PATENT DOCUMENTS

| 5,236,394 | A | 8/1993 | Collins et al. |
| 5,311,912 | A | 5/1994 | Hayward |
| 6,585,601 | B2 * | 7/2003 | Booker et al. |
| 7,226,360 | B2 * | 6/2007 | Lyon et al. |
| 7,281,984 | B2 * | 10/2007 | Foster-Hamilton et al. .. 464/175 |
| 2006/0273528 | A1 * | 12/2006 | Schirmer ....................... 277/635 |

FOREIGN PATENT DOCUMENTS

WO WO-2005098253 A1 10/2005

OTHER PUBLICATIONS

PCT International Search Report for PCT/EP2007/010858 dated Sep. 2, 2008.

* cited by examiner

*Primary Examiner* — Gregory Binda
*Assistant Examiner* — Matthieu Setliff
(74) *Attorney, Agent, or Firm* — Rader, Fishman & Grauer, PLLC

(57) ABSTRACT

A boot is disclosed having a first attachment region which is assigned to a joint, and a second attachment region which is assigned to a shaft. The boot has a plurality of folds, including a first fold region with at least two folds with a diameter that decreases in the direction of the second attachment region and at least one revolving, separating element which is arranged in an annular fold root between two folds.

8 Claims, 2 Drawing Sheets

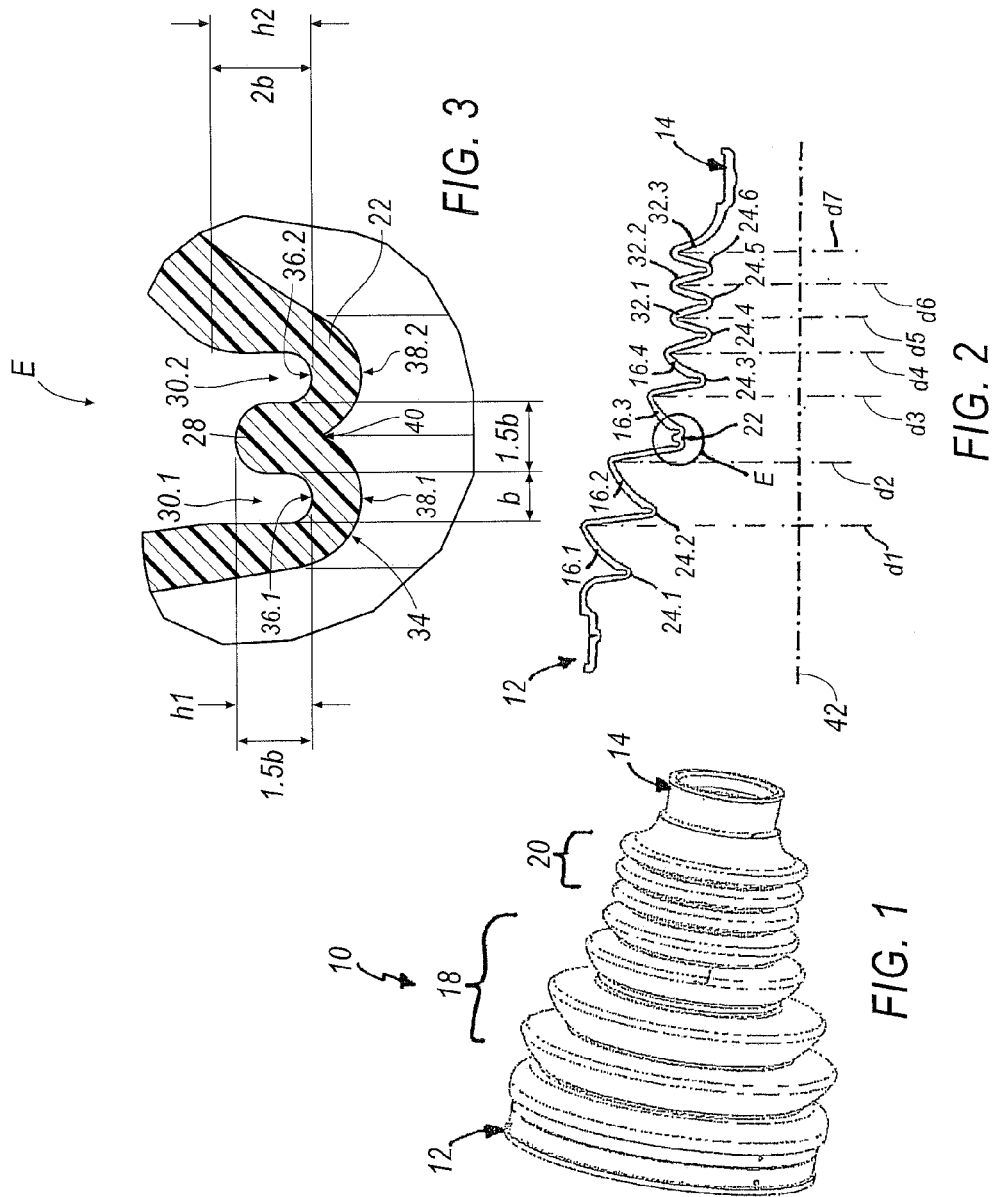

BOOT

CROSS REFERENCE TO RELATED APPLICATIONS

This application is a Continuation Application claiming benefit of PCT/EP200/010858, filed on Dec. 12, 2007, which application is hereby incorporated by reference in its entirety.

The present disclosure relates to a boot, in particular a boot for sealing an annular gap between two parts which are connected to one another in a rotationally fixed fashion and can be bent at a tangent with respect to one another and can be displaced axially with respect to one another. The boot of the present disclosure may be used for homokinetic sliding or constant velocity universal joints.

BACKGROUND

Boots of the type mentioned above are known in a variety of forms from the prior art. They are increasingly manufactured from hard polymer materials which have improved resistance in mechanical and chemical terms in comparison to previously used flexible materials. The boots have a first attachment region for attachment to a first component, in particular an outer joint member, and a second smaller attachment region for attachment to a second component, in particular in the case of a shaft, and a fold region which extends between the first attachment region and the second attachment region and has a multiplicity of annular folds or convolutes. These annular folds are embodied as external folds which each have two annular sidewall portions, connected via an annular fold peak, and are each arranged between two annular fold roots.

A problem with the use of boots, in particular for homokinetic sliding or constant velocity universal joints, are the fatigue phenomena occurring during operation when polymer materials are used. These fatigue phenomena are caused by permissible, temperature-dependent strain amplitudes being exceeded. In the case of the said joints, alternating tension/compression strains occur as a result of the alternating bending due to the folding open and folding closed of fold roots during the rotation of a bent boot.

What is needed is a boot which is of advantageous design with respect to its fatigue behavior.

SUMMARY

In one exemplary embodiment of the invention is directed to a boot having a first attachment region which is assigned to a joint, and a second attachment region which is assigned to a shaft. The boot further includes a plurality of (annular) folds and has a first fold region with at least two folds with a diameter d which decreases in the direction of the second attachment region and at least one, revolving, separating element which is arranged in an annular fold root between two folds. The provision of a separating element in this first fold region with folds with different diameters advantageously permits alternating tension/compression strains in this fold region to be halved since the angle of aperture which is brought about during the alternating bending as the bent boot revolves is divided between two bend elements in the respective fold root as a result of the provision of the separating element.

In one exemplary embodiment, the separating element divides the annular fold root into two, substantially identical, half-roots. In such an arrangement, a height $h_1$ of the separating element advantageously corresponds to approximately 1.35 to approximately 1.65 times, and in another embodiment, to approximately 1.4 to approximately 1.55 times, an inner width b of a half-root. If the height $h_1$ of the separating element were to lie significantly outside the aforesaid ranges, and if the aforesaid ranges were undershot there would be the possibility of the respective fold root in becoming unstable and thus being subject to damaging high strain amplitudes. In contrast, significant upward transgression of the aforesaid limits for the height $h_1$ of the separating element would entail problems in the manufacture of the boot, and furthermore would under certain circumstances, also adversely affect the torsion strength and shearing strength values.

In a further exemplary embodiment of the boot, an inner height $h_2$ of the half-roots corresponds approximately to twice the inner width b of a half-root. If there is provision for the inner width b of a half-root to correspond to approximately the average material thickness of the boot, then the provision of an inner height $h_2$ which corresponds essentially to twice the inner width b of the half-root ultimately results in a wall thickness of the half-roots in the annular fold root in question which constitutes a compromise between the bending capability and the torsion strength and shearing strength values. Deviations of the value of the inner height $h_2$ of approximately +/−10 percent are acceptable, that is to say a range for the inner height $h_2$ of approximately 1.8*b to approximately 2.2*b.

In yet another exemplary arrangement, the distance between the half-roots lies in a range from approximately 1.3*b to approximately 1.7*b, more preferably approximately 1.4*b to approximately 1.6*b, and even more preferably approximately 1.5*b, in which case b is the inner width of a half-root. If the distance between the two half-roots in the annular fold root in question is smaller, the two half-roots would not operate independently of one another. If the distance were larger than specified in the aforementioned regions, the overall size of the boot would be unnecessarily increased and its manufacture would become expensive.

The height $h_1$ of the separating element is measured starting from the base of a half-root to the annular peak of the separating element, while the inner width b of a half-root is determined by the annular sidewall portions of the half-root, formed on the one hand by an edge of the separating element and on the other by an edge wall of a fold of the fold region of the boot, in which case the respective edges of the half-root are oriented generally approximately parallel to one another. The height $h_2$ of a half-root is, on the other hand, measured starting from the base of a half-root as far as the turning point of an adjacent edge of a fold, at which turning point the edge bends after an initially essentially parallel course with respect to an edge of the separating element in order to form the respective fold. The width of the separating element itself is finally measured between the two side edges thereof which run essentially parallel to one another in an unbent boot.

U.S. Pat. No. 5,236,394 discloses a boot having two functional regions, wherein the first functional region has annular folds or convolutes with a diameter which decreases from a first attachment region to a second attachment region, and a second functional region with annular folds with essentially the same diameter. These two functional regions are divided by means of a rib element which is arranged in the fold root which connects the two functional regions. It is intended to ensure that the connection region is held essentially concentrically with respect to a shaft between the two functional regions of the boot. The purpose of the junction region disclosed in U.S. Pat. No. 5,236,394 is accordingly to ensure the function of the two functional regions of the fold region of the boot which is disclosed in said document. The boot which is disclosed in U.S. Pat. No. 5,236,394 also has, in the junction region, a bead which is of flattened design and which is made approximately as wide as the inner width of the half-roots formed by it in the annular fold root in question. Owing to the flattened embodiment of the bead, it also has a height which is less than the inner width of the respective half-roots. This embodiment of the annular fold root in question according to U.S. Pat. No. 5,236,394 has been selected in order to provide a secure connection to the two fold regions with different functions. However, as a result, the boot which is disclosed in said document has nothing in common with the boot according to the present disclosure in which the separating element is not only arranged in a fold region with a diameter of the folds which decreases from a first collar region to a smaller second collar region, but also contributes to the reduction in the alternating tension/compression strains by decreasing the strain amplitude by virtue of its specific embodiment. Ideally, according to the present disclosure, the at least one separating element is arranged in an annular fold root of a boot in the aforesaid fold region in which the strain amplitude is at a maximum.

In one exemplary embodiment, the separating element is arranged in a third (annular) fold root, calculated starting from the first, relatively large attachment region. In a further refinement, at least a further fold, preferably at least two folds, even more preferably precisely two folds, with a diameter d which decreases towards the second attachment region starting from the first, relatively large attachment region, is arranged following the separating element.

In yet another embodiment, a second fold region with at least two folds with substantially identical diameters is arranged after the first fold region with decreasing diameters d of the folds. The phrase "substantially identical" used herein means that the diameters d of the folds in the second fold region differ from one another by not more than +/−10 percent since as a result the method of functioning of the boot is not adversely affected. However, in the second fold region at least two folds have an identical diameter d.

The diameters d of the first and second fold regions can be calculated starting from the inner wall or outer wall of the respective fold tips of the annular folds, in which case within the sense of the present disclosure, the determination of the diameter d takes place in the same way. This depends generally on the fact that the material thickness of the boot according to the disclosure is advantageously substantially the same in the annular fold region in the vicinity of the respective annular fold peaks, in which case somewhat thicker material can be selected in the fold peaks in the second fold region than in the first fold region.

An outer contour of the annular fold root which comprises the separating element is modeled on an inner contour of the half-roots. Radial partial segments of the outer contour of the fold root are also advantageously divided by a notch which runs around the inner circumference. As a result, two genuine bending elements are produced in the region of the two half-roots so that the alternating tension/compression strains are effectively reduced. The provision of a soft junction in the outer contour between the two half-roots should advantageously be avoided since as a result the bending function is adversely affected. The circumferential notch should be embodied here so as to run to a peak into the boot material between the two half-roots, preferably in a symmetrical fashion. The radial partial segments of the outer contour of the fold root adjoin one another directly. This avoids the formation of a junction region which would adversely affect the bending functionality of the respective fold root.

The present disclosure also relates to the use of a boot described, for sealing an annular gap on homokinetic or constant velocity joints, preferably on homokinetic sliding or constant velocity universal joints.

BRIEF DESCRIPTION OF THE DRAWINGS

These above advantage of the present disclosure will be explained in more detail with reference to the following figures, in which:

FIG. 1 shows a perspective view of a boot according to an exemplary embodiment of the invention;

FIG. 2 shows a partial longitudinal sectional view of the boot of FIG. 1;

FIG. 3 shows a detail of FIG. 2 relating to the construction of an annular fold root with a separating element;

DETAILED DESCRIPTION

Figure 4:
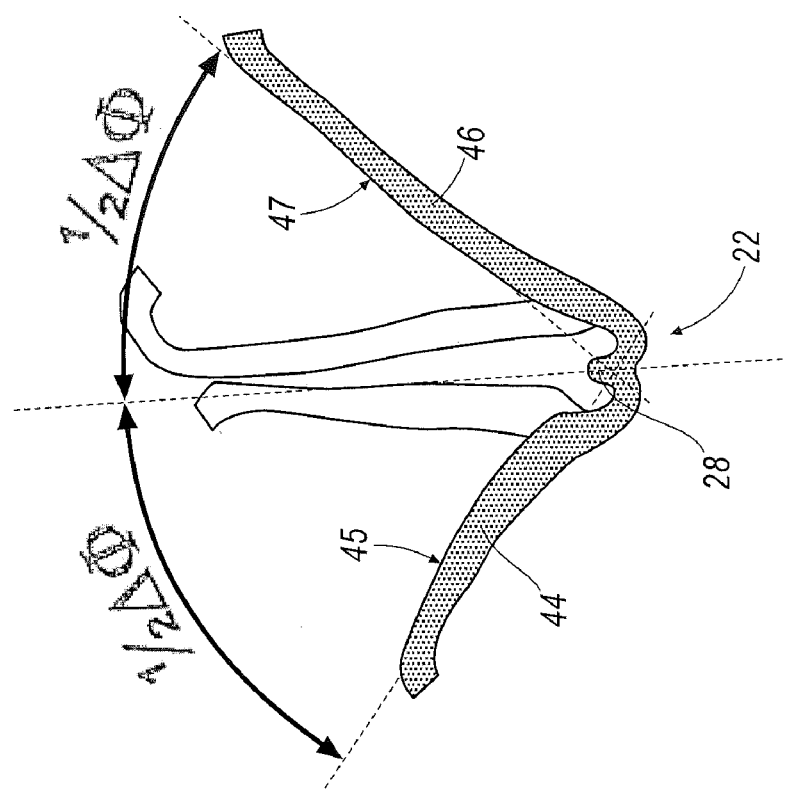
FIG. 4 is a schematic illustration of the angle of aperture in a fold root without a separating element.

Firstly, it is to be expressly pointed out that the invention is not restricted to the feature combinations as shown in the figures. Instead, the features which are respectively disclosed in the description including the description of the figures can be combined with those features specified in the figures. In particular it is to be noted that the reference signs which are incorporated in the patent claims are not intended in any way to restrict the scope of protection of the present invention but rather merely refer to the exemplary embodiments shown in the figures. Furthermore, it is to be noted that the embodiment of the inventive boot 10 according to FIGS. 1 to 3 merely constitutes one exemplary embodiment, in particular, for example, with regard to the number of annular folds provided there. More or fewer folds can be arranged both in a first fold region 18 and in a second fold region 20.

FIG. 1 is a perspective view of the inventive boot 10 with a first, relatively large attachment region 12 and a second, relatively small attachment region 14, which can, for example, be assigned to a shaft. The first fold region, with a plurality of annular folds with a diameter which decreases in the direction of the second attachment region 14, and the second fold region 20, with a plurality of folds with substantially the same diameter, are arranged between the first attachment region 12 and the second attachment region 14.

FIG. 2 shows, in a partial longitudinal section, the boot 10 with annular folds 16.1 to 16.4 of the first fold region 18 with a decreasing diameter $d_1$, $d_2$, $d_3$, $d_4$, measured from the inner wall of each fold 16.1 to 16.4, starting from their annular fold peak, in the direction from the first attachment region 12 to the second attachment region 14. Here, the diameter $d_1$ is greater than the diameter $d_2$, which is in turn greater than the diameter $d_3$, and the latter is in turn greater than the diameter $d_4$. The second fold region 20 has folds 32.1, 32.2 and 32.3 with substantially the same diameter $d_5$, $d_6$ and $d_7$. An annular fold root 22, which has a separating element 28 (see FIG. 3 in this regard) is arranged between the second fold 16.2 and the third fold 16.3 of the first fold region 12. The fold 16.1 runs between annular fold roots 24.1 and 24.2, and the fold 16.2 runs between fold roots 24.2 and 22, the fold 16.3 runs between the fold root 22 and a fold root 24.3, and the fold 16.4 runs between a fold root 24.3 and a fold root 24.4. The folds 32.1 to 32.3 of the second fold region 20 are arranged between annular fold roots 24.4 and 24.5 or 24.5 and 24.6 or 24.6 and the second attachment region 14. The boot 10 is illustrated oriented to a central axis 42 here in FIG. 2.

FIG. 3 shows a detail E of FIG. 2 for better illustration of the separating element 28. The latter is arranged in the annular fold root 22 between the folds 16.2 and 16.3 with diameters which decrease in the direction from the first attachment region 12 to the second attachment region 14. The arrangement of the separating element 28, which is embodied in the manner of an annular rib and embodied so as to continuously run around the entire circumferential surface of the boot 10, forms two identical half-roots 30.1 and 30.2. These half-roots 30.1 and 30.2 have an inner contour 36.1 and 36.2 and an outer contour 34 with radial partial segments 38.1 and 38.2. A notch 40 which extends in a pointed fashion into the material of the boot is arranged between the radial partial segments 38.1 and 38.2, as a result of which the radial partial segments 38.1 and 38.2 are arranged directly adjacent to one another.

Each half-root 30.1 and 30.2 has an inner width b, measured between the edges or side-wall portions of the separating element 28 and that edge of the respective fold 16.2 or 16.3 which is arranged opposite. The separating element 28 itself has here a width which corresponds to 1.5 times the inner width b of the half-roots 30.1 or 30.2. The width of the separating element 28 is measured between the two side edges or sidewall portions thereof which run in parallel according to FIG. 3. Furthermore, the separating element 28 has a height which corresponds to 1.5 times the inner width b of the half-roots 30.1 and 30.2. The height $h_1$ of the separating element 28 is in this case matched to the upper side of the separating element 28 starting from the base of one of the two half-roots 30.1 or 30.2 and the turning point of the separating element 28 which is embodied in the manner of an annular rib. Finally, the half-roots 30.1 and 30.2 have a height $h_2$ which corresponds to approximately two times the inner width b thereof. The height $h_2$ is determined starting from the base of the respective half-roots 30.1 and 30.2 as far as a turning point in the edges of the respective folds 16.2 and 16.3. Here, the respective edges of the folds 16.2 and 16.3 in the region of the fold root 22 are embodied so that at first they run substantially approximately parallel to one another, and then bend off in opposite directions.

FIG. 4 then shows by way of example the behaviour of an annular fold root 24 which can be a fold root such as is present also in the boot 10 according to an embodiment of invention, but also an annular fold root of a boot according to the prior art, and the angle θ of aperture, in which case, in the first instance, the edges of adjacent folds are illustrated bearing against one another at least in partial regions, represented by contour lines, when a boot is bent on the compression side, and, in the second instance, the conditions on the tension side are represented by a shaded illustration of the respective edges. In the situation which is represented by contour lines on the compression side, outer sidewalls 45 and 47 of a left-hand fold 44 and of a right-hand fold 46 bear against one another at least in partial regions.

Figure 5:
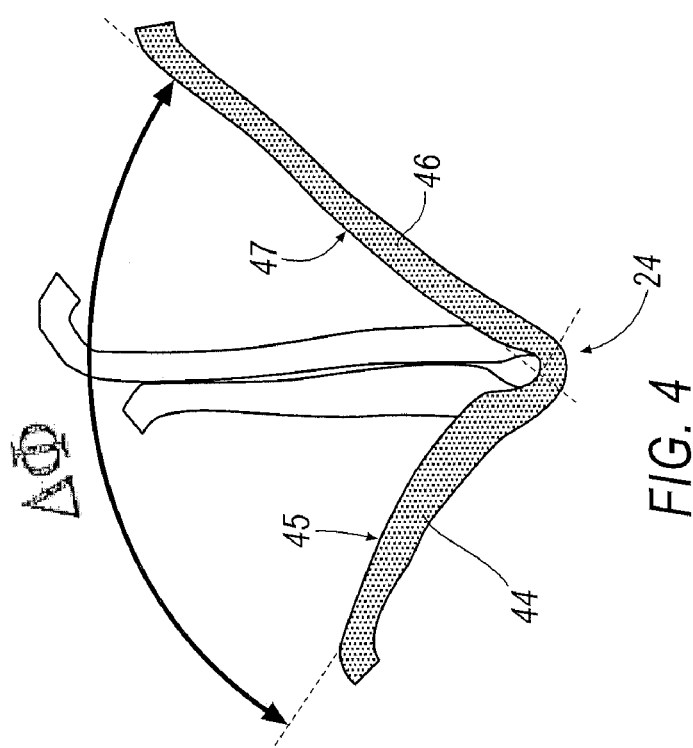
FIG. 5 is a schematic illustration of the angles of aperture in a fold root with separating element according to an exemplary arrangement of the inventive boot.

In contrast to the situation in FIG. 4, FIG. 5 illustrates a situation in which the latter finds itself again in the annular fold root 22 with the separating element 28 according to the boot 10 disclosed herein. The provision of the separating element 28 means that actual two bending elements are provided, as a result of which the angle θ of aperture is halved. The outer sidewalls 45 and 47 of the fold edges 44 and 46 which lie opposite bear against one another here directly only in a relatively small partial region and are spaced apart from one another in particular in the region of the annular fold root itself. The strain amplitude is therefore reduced, and alternating tension/compression strains are decreased.

The boot according to the disclosure therefore advantageously achieves a reduction in the alternating tension/compression strains so that the latter has reduced fatigue phenomena compared to boots according to the prior art. Through the specific embodiment of the annular fold root 22 with the separating element 28 and the approximately identical wall thickness, also achieved in this region, referred to the average material thickness of the boot, the resistance forces against torsional and shear strain are kept within ranges which are known from boots according to the prior art.

What is claimed is:

1. A boot, comprising:
   a first attachment region which is assigned to a joint, and
   a second attachment region which is assigned to a shaft,
   wherein the boot further includes having a plurality of folds and wherein the boot has a first fold region with at least two folds with a diameter d which decreases in the direction of the second attachment region and at least one revolving, separating element which is arranged in an annular fold root between two folds;
   wherein the separating element divides the annular fold root into two annular half-roots; and
   wherein a height $h_1$ of the separating element corresponds to approximately 1.35 to approximately 1.65 times an inner width b of a half-root.

2. The boot according to claim 1, wherein an inner height $h_2$ of the half-roots corresponds approximately to twice an inner width b of a half-root.

3. The boot according to claim 1, wherein the separating element is arranged in a third annular fold root, calculated starting from the first attachment region.

4. The boot according to claim 1, further comprising at least one further fold with a diameter d which decreases towards the second attachment region is arranged following the separating element.

5. The boot according to claim 1, further comprising a second fold region with at least two folds with essentially identical diameters d are arranged after the first fold region.

6. The boot according to claim 1, further including an outer contour of the fold root which comprises the separating element is modeled on an inner contour of the half-roots.

7. The boot according to claim 6, wherein radial partial segments of the outer contour of the fold root are divided by a notch which runs around the inner circumference.

8. The boot according to claim 7, wherein the radial partial segments adjoin one another directly.

* * * * *